United States Patent [19]

Schwartz

[11] Patent Number: 4,695,507

[45] Date of Patent: Sep. 22, 1987

[54] LOW TOXIC CEILING BOARD FACING

[75] Inventor: William C. Schwartz, Greensboro, N.C.

[73] Assignee: Burlington Industries, Inc., Greensboro, N.C.

[21] Appl. No.: 774,524

[22] Filed: Sep. 10, 1985

Related U.S. Application Data

[63] Continuation-in-part of Ser. No. 731,075, May 6, 1985, abandoned.

[51] Int. Cl.⁴ .................. B32B 17/02; B05D 3/02
[52] U.S. Cl. .................... 428/228; 427/288; 427/389.8; 428/268; 428/273; 428/307.3; 428/311.5; 428/313.9
[58] Field of Search .............. 427/389.8, 288; 428/228, 268, 273

[56] References Cited

U.S. PATENT DOCUMENTS

| | | | |
|---|---|---|---|
| 3,717,500 | 6/1973 | Mastrianni | 427/381 |
| 3,759,740 | 9/1973 | Campbell | 427/387 |
| 3,877,974 | 4/1975 | Mischutin | 428/290 |
| 4,118,526 | 10/1978 | Gregorian et al. | 427/350 |
| 4,201,805 | 5/1980 | Benisek | 427/389.9 |
| 4,246,311 | 1/1981 | Hirst | 428/195 |
| 4,263,362 | 4/1981 | Straka | 427/389.8 X |
| 4,288,475 | 9/1981 | Meeker | 427/389.8 X |
| 4,294,879 | 10/1981 | McHenry | 427/389.8 X |
| 4,524,093 | 6/1985 | Devry | 427/389.9 |

Primary Examiner—Thurman K. Page
Attorney, Agent, or Firm—Nixon & Vanderhye

[57] ABSTRACT

A process for manufacturing a coated, sculptured, nubby fabric useful as a ceiling board facing and the like comprising:

(1) applying to at least one face of a nubby, textured fabric substrate a uniform layer of a thick, flame-retardant, non-cellular coating containing a pigment, a flame-retardant and a resin contacting and encapsulating substantially all of the yarns of the substrate with a tough, adherent film, the coating composition when exposed to heat or flame emitting vapors of low-toxicity and low-smoke, and (2) drying the thus-coated substrate.

13 Claims, 3 Drawing Figures

LOW TOXIC CEILING BOARD FACING

CROSS-REFERENCE TO RELATED APPLICATIONS

This application is a continuation-in-part of my earlier application Ser. No. 731,075 filed May 6, 1985, now abandoned.

BACKGROUND OF THE INVENTION

The present invention relates to a decorative acoustical ceiling or wall surfacing fabric and more particularly to a fabric exhibiting a sculptured, highly textured and nubby architectural appearance and a process for making this fabric. The finished fabric is used as a ceiling board facing or a wall facing as such or applied to a solid or fiberous backing, for instance a bat or pad of glass fibers, for use in a ceiling or wall board.

There are several commercially available ceiling boards which utilize glass fabric as the decorative facing. Generally, however, the fabric covered board is spray painted in a separate operation to achieve the desired textured, three-dimensional, and nubby appearance. Ceiling board manufacturers have frequently expressed their need for a prefinished fabric which would exhibit and retain a three-dimensional, nubby appearance, and which requires only lamination to a base substrate to produce a salable ceiling board.

A foam-coated ceiling board facing is described in U.S. Pat. No. 4,162,342 issued on July 24, 1979 to the present inventor in which a cellular foam-coated fabric is made by sculpturing a layer of vinyl or acrylic foam on one or both sides of a nubby textured fabric. The foam is applied and distributed over the entire surface of the fabric. While the products described in my earlier patent exhibit an enhanced degree of loft, texture, and nubbiness, in many applications a fabric with improved properties including resistance to soiling, ease of cleanability, and one which emits fewer and less toxic fumes when burned is desirable.

Fire safety has become a paramount concern following highly publicized fires during the early 1980s. As examples, 85 people died in the MGM Grand Hotel fire in Las Vegas, another 30 victims lost their lives in the Stouffer Hotel fire in Westchester, N.Y., 27 prisoners died in a Biloxi, Miss. jail fire, and 23 passengers perished in an Air Canada flight cabin fire.

Most of these deaths were not caused by the flames or heat from the fire, but rather from the inhalation of smoke and toxic fumes, often far away from the fire itself. While controversy continues as to precisely what fumes and gases were responsible for these deaths, no one can dispute that the less volume of smoke and fumes released in a fire, and the less toxic these fumes are, the greater the chance victims of a fire have for survival.

The products of the present invention are both flame-retardant and low-toxic and find uses in the lodging industry and for commercial and home use.

The preferred product of the present invention is a lox-toxic and highly flame-retardant ceiling board facing having not only an attractive architectural appearance, but also a high degree of whiteness and opacity. The product is less prone to soiling, is easier to clean than previous ceiling board facings, yet is resistant to fading and discoloration.

BRIEF DESCRIPTION OF THE DRAWINGS

Appended are three photographs of products of the present invention in which the finish is applied using different procedures. All photographs are approximately 1:1.

SUMMARY OF THE INVENTION

The present invention provides a three-dimensional fabric useful as a ceiling board facing or a wall board facing, and a process for making this three-dimensional fabric which, when exposed to fire or extreme heat, does not emit noxious, often poisonous gases.

It is an object of the present invention to produce an improved flame-retardant, low-toxic fabric for ceiling board facing by applying a resin/flame retardant/pigment system that emits only low or preferably non-toxic vapors upon combustion.

It is another object of the present invention to provide an improved fabric for ceiling board facing which exhibits the required smoke and flame resistance, color stability (light fastness), and heat stability yet is easy to clean. It is a further object of the present invention to provide an improved fabric for ceiling board facing which exhibits distinct and varied surface three-dimensional features that are architecturally pleasing and commercially acceptable.

These and other objects are achieved by selectively applying to a suitable base fabric, either woven or nonwoven, a ceiling board finish composed of resins, pigments, binders, flame retardants and other adjuvants. This coating or "finish" as it is termed in the art exhibits low-toxicity and low-smoking properties when exposed to heat or flame. The three-dimensional fabric of the present invention has a nubby look and has a coarse and rough architectural hand.

When exposed to heat or burned, the improved ceiling board facing has a finish which releases only small amounts of fumes and those fumes that are released are relatively low-toxic fumes. The finish is resistant to soiling, and when it eventually becomes soiled, is easier to clean. These improvements are possible with the ceiling board fabric having the unique finish which is the subject of the present invention and is described in more detail below.

The finish disclosed herein differs from earlier foam-coated finishes in both chemical composition and in the physical manner it may be applied to selected fabric substrates. Not being a cellular foam or expandable into a cellular foam, the finish of the present invention may be applied using standard textile padding operations.

Figure 1:
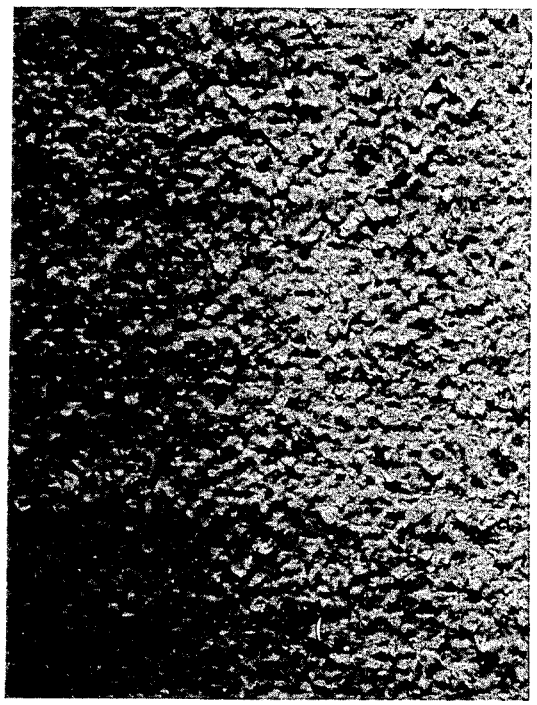
FIG. 1 is a photograph of a ceiling board facing in which the finish is applied by padding.
Figure 2:
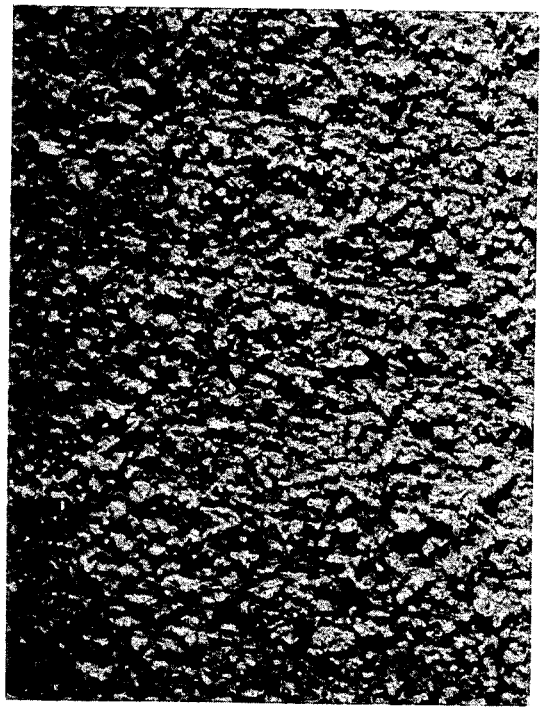
FIG. 2 is a photograph of a ceiling facing in which the finish is froth coated onto the glass fabric substrate.
Figure 3:
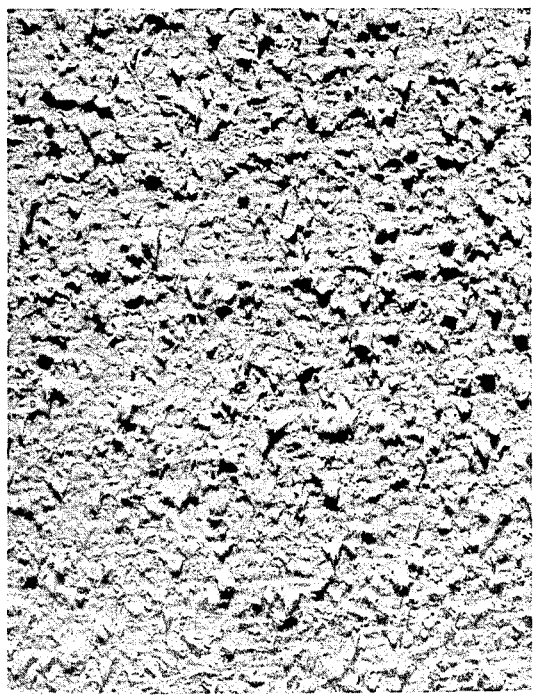
FIG. 3 is a photograph of a ceiling board facing in which the finish is knife coated onto the glass substrate.

The appended photographs, FIGS. 1-3, show visually the different effects achieved by different methods of applying the finish composition. Pad finished facings (FIG. 1) have a distinct appearance, froth-coated facings have a deeper look, whereas a knife-coated facing has rather a flatter appearance.

The finish formulation consists of highly selective resin(s), flame-retardant(s), white pigments, and auxiliary chemicals as needed not only to develop the required architectural acceptance but also to achieve the low-toxicity and flame retardancy. The finish forms a tough, dry film around the yarns of the substrate, and this film is less prone to attract and hold dirt compared to a foam-coated product. The finish is highly loaded with white pigments and one or more flame-retardants in order to pass required flame and smoke tests, the details of which are described below. The fabric has a sculptured, pleasing appearance with the finish enhancing the loft, texture, and nubbiness of the fabric.

The carefully chosen chemical components in the disclosed formulation are essential to establishing the low-toxicity of the product when exposed to heat or fire. The finish is essentially free of halogen groups (chlorides, bromides, fluorides), nitrile, nitrate, amine, sulfate, phosphate, and other potentially offending chemical groups which can emit toxic fumes when burned. By judicious choice of finish components a product is prepared which when exposed to heat or burned yields as the principal products of combustion carbon dioxide, water vapor, and carbon monoxide. These gases of combustion are among the least toxic and they are formed when any natural product such as wood is burned. Due primarily to the high pigment loading, a typical product of this invention weighs about 14 ounces per square yard (OSY), but only 1.3 ounces of the total weight is organic and capable of burning.

In addition to the low-toxicity and low-smoking properties, the product also exhibits excellent acoustical properties, improved whiteness and opacity for light reflection, resistance to discoloration when exposed to sunlight or aged, and improved soil resistance and cleanability.

DESCRIPTION OF THE PREFERRED EMBODIMENTS

The substrate-fabric used in the process of the present invention is preferably characterized by a certain degree of nubbiness and texture. The desired degree of nubbiness and texture may be obtained by using textured fill yarns. Texture is a term which describes the surface effect of a fabric or the structural quality of a fabric. As defined in *Man-Made Fiber and Textile Dictionary* (Celanese Corporation 1974), texturing is a process of crimping, imparting random loops, or otherwise modifying continuous filament yarn to increase cover, resilience, abrasion resistance, warmth, insulation, and moisture absorption or to provide a different surface texture. As an example, one suitable texture fill yarn is identified as TEX 129 yarn, which is textured glass yarn manufactured by the Burlington Glass Fabrics Division of Burlington Industries, Incorporated. TEX 129 yarn is manufactured by the air jet method, as described in the Man-Made Fiber and Textile Dictionary. In this method of texturing, yarn is fed through the turbulent region of an air jet at a rate faster than it is drawn off at the far side of the jet. In the jet, the yarn structure is opened, loops are formed, and the structure is closed again. Some loops are locked inside the yarn while others are locked on the surface of the yarn. The product of this texturing process, such as TEX 129, is an entangled yarn suitable for use in the process of the present invention. Other textured yarns may also be used. In general, the bigger and bulkier the textured fill yarn, the greater the three-dimensional character of the final fabric. However, a balance between the bulky fill yarns and the smooth filament warp yarns is desirable. The desired balance gives the illusion of depth and leads to high and low areas in the fabric. TEX 129 yarn is considered to be a large bulky yarn of the type suitable for use in the process of the present invention. Other textured fill yarns, including textured fill yarns which are smaller, may be used.

The fabrics used in the present invention are typically glass fiber fabrics. The glass fiber fabrics used are woven, knitted, or non-woven fabrics—most commonly woven—and are composed of yarn made of glass fibers or filaments, or in the case of non-woven, discrete glass fibers. However, any fabric which has the desired texture or nubby appearance may be used, provided that when the fabric is processed and coated according to the present invention, the final product satisfies the relevant flammability specifications. The relevant flammability specifications are set forth in the ASTM-E 84 or UL 723 test methods, which are hereby incorporated by reference. These methods test the fire hazard classification of building materials. For commercial products a class A rating as defined in these tests is generally desired.

Glass fiber fabrics are preferred in the process of the present invention since they are inherently nonflammable. A particularly preferred glass fiber fabric is identified as S/1963 and is sold by the Burlington Glass Fabrics Company, a division of Burlington Industries, Inc. of Greensboro, N.C. S/1963 fabric is made from a warp yarn with 18 ends per inch of ECG 150 1/10 filament yarn, and TEX 129 fill yarn with 16 picks per inch in the fill. An ECG 150 1/10 filament yarn is a fiberglass textile yarn, specifically an electrical glass, continuous filament yarn with an average filament diameter equivalent to 0.00036 inch and 15,000 yards of bare glass filament per pound. The "1/10" indicates that the yarn is made up of a single unplied strand.

APPLYING THE FINISH

Previous proposals involve a process of applying a cellular foam containing a latex polymer and white pigments along with flame retardants to a greige (uncoated) glass fabric and then passing the fabric through gapped pad rolls to redistribute the foam on the fabric surface thus producing a highly textured or nubby appearance. The coated fabric so produced is useful as a ceiling board facing but there are several areas where improvements are desirable.

(1) The finish is cellular and myriads of tiny bubbles or air pockets are seen when viewed under a microscope. While advantageous for their sound absorbing/attenuating properties, these openings and pores can actually serve to filter dirt and dust out of the air passing over the fabric and this results in a soiled ceiling.

(2) The cellular structure traps dirt making the fabric difficult to clean. Vacuuming removes only surface dirt and scrubbing the fabric results in loss of texture or nubbiness when foam particles are physically removed.

(3) Vinyl chloride copolymer latex-based finishes, and halogenated flame retardants when heated or exposed to a flame, may give off hydrogen chloride and/or hydrogen bromide or other gases which may be harmful to the respiratory system when inhaled.

The low-toxic ceiling board facing of the present invention overcomes these and other drawbacks. First, the novel finish need not be applied as a stabilized cellular foam but rather more conveniently as a resin bath solution. In such a procedure, which is commonly called "padding", the fabric is immersed in the resin bath, excess finish is squeezed out by passing the wet fabric through rubber to rubber or rubber to steel pad rolls and the still wet fabric is then dried in an oven. This obviates the need for specialized equipment and procedures when one applies a cellular foam to a substrate. The applied and dried finish encapsulates the individual yarns with a tough film. Other procedures for applying the finish to the substrate may be used such as froth coating, kiss-coating, roller coating, printing, spraying, knife coating and the like.

Since the finish is non-cellular, there are not nearly as many pores or voids which can attract or hold dirt. The dirt or soil may deposit on the surface of the finished fabric or it may collect in the open areas between the yarn crossovers. In either case, this type of soiling is comparatively easier to clean using dry systems, for instance, with a vacuum cleaner.

A ceiling board facing is produced by padding a glass fabric with a highly pigmented aqueous latex formulation. The fabric may be padded once or twice, with a drying step in between, depending on the desired level of finish add-on.

While padding finds favor in its simplicity and ease of process control, it does have some drawbacks for making a ceiling board facing. For example, padding deposits the finish equally on both the fabric face and back whereas a ceiling board facing requires a finish only on the decorative or face side; any finish on the back is unnecessary, wasted and adds unwanted costs. A finish on the back may also reduce the number of potential contacts or glue points between the fabric and the board to which it will be laminated, and this could result in a lower adhesive bond strength and/or the need for additional adhesive.

A further disadvantage to padding is the limitation it puts on the amount of finish that can be applied to the fabric in a single pass. The amount of finish add-on is determined by the wet pick-up of the fabric and by the percent solids of the finish. The preferred glass fabric used herein, style 1963, weighs about 4 OSY in the greige state and has a wet pick-up of about 220% when padded with a typical finish according to the present invention at 15 lbs pad pressure. A typical single pass pick-up is about 5 OSY (calculated as solids); however, if a finish pick-up of 8-10 OSY is desired for a more nubby appearance, the fabric must be padded a second time through the same finish. The amount of finish add-on can also be increased by reducing the pad pressure to increase the wet pick-up and by increasing the percent solids of the finish.

Another finishing technique which does not have the inherent drawbacks of pad finishing is froth coating. A froth may be described as a mechanically produced foam with an unstable foam cell structure. When air is introduced into a latex formulation of the type of the present invention at a controlled rate and under very high shear, a froth or foam is produced which looks much like an aerosol shave cream. When this type of foam is subjected to heat as during drying, the foam cells dissipate and it is difficult to detect any cell structure.

The porosity or openness of a fabric is critical if it is to be used as a ceiling board facing since the sound must be able to pass through the facing in order to be absorbed by the acoustical board behind. A froth coating is particularly useful in creating a porous surface. Although the froth is applied in a continuous layer, the coating contains millions of small foam cells which rupture when exposed to heat forming numerous voids. If the coating is sufficiently thin, these voids actually produce small holes in the coating and a porous product is the result.

The fabric texture and fabric construction can also influence the final porosity of the coated fabric. The more open the fabric, the more difficult it is to bridge the distances between the yarns, particularly as the froth begins to collapse and shrink during drying. Texture and other irregular features in the fabric also encourage the froth to collapse in those areas where the coating is thinner and therefore more unstable.

Those skilled in this art will appreciate that a froth coating for a ceiling board facing must be carefully controlled in order to produce a consistent, quality product. If too many foam cells are left in the coating after drying and curing, these cells can trap dirt and make it difficult to clean the product. If the coating is too thick, the porosity and therefore acoustics can suffer; if the coating is too thin, an uneven texture may result which may not be aesthetically acceptable. The types and amounts of surfactant used to generate the foam, the viscosity of the mix both before and after frothing, the density of the froth, the method of application, and the drying cycle itself can all influence the properties and the appearance of the final product. These factors are carefully adjusted to produce the type, thickness and texture of finish desired.

Another finishing technique which is useful in producing a textured ceiling board look on glass fabric involves knife-coating a coating paste on the fabric face. A paste for this purpose is basically the same mix used in pad finishing except it is thickened to obtain a higher viscosity for coating purposes. This type of coating is a major disadvantage because of the reduction in acoustical properties. However, if the coating is applied as a thin layer on a textured fabric, the protruding yarns or filaments may help form openings in the coating as the coating will not fully cover these areas. If more porosity is desirable, the coated fabric can be needlepunched to create more openings. The major advantage to this type of finish is the reduced soiling tendency and improved cleanability since there are fewer voids or irregular features for the dirt to cling to. This technique is described below in Example 3.

Unlike cellular foams which enhance the loft, texture, and nubbiness of the base fabric via a high volume (mostly air) of material, the unfoamed finish of the present invention achieved by the padding method uses a much heavier application of finish in terms of weight, not volume, of material added to the fabric substrate, for instance, up to 10 ounces per square yard to obtain an equal appearance compared to cellular foams. In effect the finish of the present invention is similar to a textured ceiling paint in that the finish is highly loaded with white pigments to achieve a nubby and textured look and a large amount of finish is applied to the fabric to attain the desired look.

PHYSICAL TEST RESULTS

Soiling and Cleanability

A significant advantage of the ceiling board facing of this invention compared to previous foam coated finishes is the improved soiling resistance and cleanability. The ceiling board of the present invention is resistant to dry soiling, particularly to airborne dust and soil normally found inside a building. To check for soiling, a "soiling machine" was used which pulls about 200 cubic feet of air per minute through a 6 inch diameter tube. The fabric was placed across this tube and a 0.5 gram loading of 3M Drapery Soil II (a scientifically developed soil mixture containing contaminants normally found indoors) was then forced through the fabric. The fabric was then removed and evaluated for soiling in comparison to other samples.

Compared to the standard foam coated product, much less soiling was observed. The samples were then vacuumed with a standard 3 HP canister vacuum cleaner using an upholstery brush attachment. The vacuumed area was then checked for soil removal. The improvement in the cleanability of the ceiling board fabric finished in accordance with this invention compared to the foamed finish of the prior art was dramatic.

To obtain more objective numerical data on soiling and cleanability, a Hunter Color Difference Meter color eye was used to measure the degree of whiteness before soiling, after soiling, and after vacuuming. The results were:

| Whiteness Index (Hunter Color Eye) | | |
| --- | --- | --- |
| Control | Soiled | Soiled & Vacuumed |
| 82.24 | 43.91 | 73.62 |

Careful examination of the vacuumed sample revealed that most of the soil was removed by vacuuming and the cleaned fabric was not objectionable for appearance or whiteness.

FLAMMABILITY

Because of the low organic content of the finish of this invention and the nature and the amount of flame retardant incorporated into the finish, this product is highly flamed retardant and produces very little smoke or fumes when burned.

Aluminum hydrate is a particularly suitable flame retardant for this finish. When the finish is exposed to a flame or high temperatures, the hydrate begins to decompose into aluminum oxide and water vapor absorbing heat during the process. Thus, the fabric remains relatively cool and is difficult to ignite. If enough heat from a fire is present to ignite the organic part of the finish, the water vapor helps dilute combustible gases and also aids in putting out the fire.

The particular aluminum hydrates utilized in the finish are ultrafine in particle size and they can be expected to release water vapor faster in a fire compared to larger particle size hydrates. Also, due to the small particle size (average of 1–1.5 $\mu$m) the powder has a high degree of whiteness which helps produce a whiter, more light reflecting surface. Optimum light reflectance is required for ceiling board facings in commercial applications because less lighting is required.

One of the requirements of a ceiling board used in areas covered by fire code regulations is that is pass a horizontal flammability test frequently called the Tunnel Test. The ASTM version of the test is identified as "ASTM E-84-81a: Surface Burning of Building Materials." It is similar to UL-723, NFPA No. 255, ANSI No. 2.5, and UBS 42-1. The test covers both flammability and smoke developed during a 10-minute fire exposure. Asbestos-cement board and red oak flooring are used as comparative standards, and their responses are assigned arbitrary values of 0 and 100, respectively. When the facing of the present invention was tested, the results were a Flame Spread Index of 0 and a Smoke Development Value of 5. Furthermore, no ignition of the fabric was noted in the 10 minutes of exposure to the flame and neither afterflame nor afterglow were evident upon test completion. A flame spread of 25 or less is required for a class I or class A rating so the flame retardant properties of the product herein far exceed current flammability regulations.

TOXICITY OF BURNING GASES

Toxicity as it relates to the types and quantity of toxic fumes produced when a product is exposed to a fire is another important consideration. Most fire related deaths are not caused by the flames, but rather from the inhalation of toxic fumes. The less toxic these fumes are and the less volume of fumes produced in a fire, the better the chance for survival.

The low toxic ceiling board facings of the present invention are unique in that the total amount of organics present on the fabric is quite low, and indeed those organics that are present produce relatively low toxic gases when burned. To test for toxicity, a sample was thermally decomposed and the resulting gases measured and analyzed by a procedure referenced in Military Specification MIL-M-14G. Under these conditions, the sample did not ignite even when heated to 600° C. and only light amounts of light grey smoke were observed. The composition of the atmosphere produced by the sample in parts per million was:

| | |
| --- | --- |
| Hydrogen Chloride | 0 |
| Aldehydes as HCHO | 2 |
| Ammonia | 0 |
| Carbon Monoxide | 80 |
| Carbon Dioxide | 725 |
| Oxides of Nitrogen as $NO_2$ | 12 |
| Cyanides as HCN | 0 |

LIGHTFASTNESS AND HEAT STABILITY

When the low-toxic ceiling board facing of the present invention was tested for colorfastness according to "AATCC Test Method 16A-1964 Colorfastness to Light: Carbon-Arc Lamp, Continuous Light," no observable change in color or whiteness was observed even after 300 hours of exposure.

The low-toxic ceiling board facing is also highly resistant to discoloration by mild heat. No noticeable difference in color or whiteness was detected when the material was heataged at 275° F. for 30 minutes.

SILICONE BASED FINISH

Silicone resins or polymers are among the least toxic of all organic materials when exposed to a flame or high heat and these polymers are also useful as the resin component of the finish used in accordance with the present invention. Silicones are partially inorganic and partially organic. The backbone of the silicone polymer chain is the repeating Si-O unit while the side groups are organic. When burned, these polymers emit fewer fumes and gases than totally organic polymers which have a carbon backbone. This is because only the organic portions of the silicone are capable of forming gases when burned while the inert portion forms inert silicon oxide powders. In contrast, virtually 100% of a totally organic polymer can be converted into gases with the carbon being converted to carbon monoxide and carbon dioxide.

Although the regular acrylic based finishes described herein are highly flame retardant and very low-toxic when exposed to a fire, there may be areas where even lower levels of flammability and toxicity may be desirable, such as for ceilings on ships, submarines, airplanes, etc. This can be accomplished by replacing the acrylic latexes with silicone latexes or elastomers. A particularly suitable water-based silicone elastomer is manufactured by Dow Corning Corp., Midland, Mich., and is identified as Silastic Q3-5024. It has good pigment binding properties and excellent bath stability. This is described in more detail in Example 4 below.

The components in the finish used to make the ceiling board facing of the present invention are specifically evaluated and selected for compatibility in the finish, lox-toxicity, flame retardancy, economics, and primarily, to achieve the desired properties in the final product.

A typical formulation based upon an acrylic resin is as follows:

| Water | 340 g |
|---|---|
| Ammonia | 5 g |
| Tamol SN | 5 g |
| Antifoam DB-110 | 3 g |
| Glycerin | 5 g |
| Calcium carbonate | 225 g |
| Aluminum hydrate | 450 g |
| Rhoplex AC-22 | 220 g |

The first five components serve as the dispersing medium for the white pigments and the latex resin and help keep the finish from foaming excessively, from drying out, or from becoming unstable in processing.

Calcium carbonate is an economical inert white pigment that imparts whiteness and opacity to the finish.

Aluminum hydrate is a well known non-toxic flame retardant and smoke suppressant. When heated to 230° C., it liberates water vapor which helps dilute combustible gases. The particular aluminum hydrate is preferred in the form of an ultrafine particle size, preferably in the range of 1 to 2 microns. RH-730 is such an aluminum hydrate and was obtained from Reynolds Metals, Richmond, Va. It is white in color and also acts as a pigment to give extra whiteness and opacity to the finish.

Rhoplex AC-22, an acrylic resin, is an excellent pigment binder even at high loadings and as such allows the formulator to use only a small amount of organic resin to hold the relatively large amounts of inert inorganic pigments to the fabric. When burned, the volume of organic gases given off thus is quite low. Other acrylic-based pigments may be used as well or mixtures of two or more acrylic resins or silicone latexes or elastomers. Also mixtures of acrylic resins and silicone resins are contemplated.

All components were chosen for their non-toxic features in normal use and for their low-toxic properties when exposed to heat or flame. Although the pigment binder is organic, when it is burned, it emits only carbon dioxide, carbon monoxide, and water vapor. It is essentially free of noxious components including halides, sulfur, nitrogen, etc., which can form toxic fumes when burned.

The finish formulation of the invention may also include one or more soil release fluorochemicals (Scotchguard) applied as a spray to the fabric in a separate step. Alternatively, an extra-firm acrylic resin may be included in the formula as extra-hard resins show less tendency to attract and hold soil compared to softer resins.

Colored pigments can also be added to achieve different colors in the final product as desired. A three-dimensional print can also be printed onto the top of the finished product as described in U.S. Pat. No. 4,320,163 and 4,433,022 to Schwartz and Blalock, the disclosures of which are hereby incorporated by reference. While a three-dimensional printed product would no longer be low-toxic because of the vinyl nature of the print, it represents an improvement over the foamed three-dimensional printed substrate in terms of soiling and cleanability.

EXAMPLE 1

This example illustrate the preparation of a ceiling board facing in which the finish is applied as a froth to the glass fiber substrate.

The following ingredients were mixed in the order listed in a high shear (Eppenbach) mixer:

| Water | 340 g |
|---|---|
| Ammonia (28% concentrated) | 5 g |
| Tamol SN | 5 g |
| RH-730 Aluminum Hydrate | 380 g |
| Calcium Carbonate | 225 g |
| Rhoplex AC-22 | 225 g |
| Rhoplex TR-407 | 50 g |
| Tamol 850 | 5 g |
| Triton X-100 | 3 g |

Tamol SN, Tamol 850, and Triton X-100 are dispersing aids and surfactants manufactured by Rohm & Haas Company, Philadelphia, PA. RH-730 is an ultra-fine particle size aluminum hydrate powder from Reynolds Metals Co., Richmond, VA. Rhoplex AC-22 and TR-407 are acrylic latexes from Rohm & Haas.

The above formulation was prepared then foamed with a Hobart mixer to give a foam density of 300 grams per liter. The froth was knife-coated on one side of S/1963 glass fabric at a thickness of 60 mils and the fabric was then dried and cured for 3 minutes at 300° F. in a forced-air oven. The resulting fabric exhibits a very highly textured and nubby appearance suitable for a ceiling board facing.

EXAMPLE 2

Another fabric was finished in a manner similar to Example 1 with modifications in the chemical formula. Two different aluminum hydrates were substituted for Reynold's RH-730 product which was discontinued in late 1984. The formulation consisted of:

| Water | 300 g |
|---|---|
| Calgon (sodiumhexametaphosphate) | 5 g |
| Ethylene Glycol | 10 g |
| Polywet ND-2 | 5 g |
| Micral 932 | 160 g |
| Hydral 710 | 160 g |
| Calcium Carbonate | 160 g |
| Rhoplex AC-22 | 140 g |
| Rhoplex TR-407 | 40 g |
| Triton X-100 | 8 g |

Polywet ND-2 is an anionic electrolyte from Uniroyal, Inc. in Naugatuck, Conn. used as a dispersant.

Micral 932 is an ultrafine aluminum hydrate powder from Solem Industries, Inc. in Norcross, Ga. and Hydral 710 is an ultrafine aluminum hydrate powder from Alcoa Co. in Bauxite, Ark.

As before, the chemicals were mixed in the order given with an Eppenbach high shear mixer and then foamed with a Hobart mixer to produce a froth with a density of 350 grams per liter. The forth was then knife-coated on one side of S/1963 glass fabric at a thickness of 60 mils and the material was dried at 300° F. for 3 minutes. A highly textured appearance was achieved.

In comparing these samples to a padded fabric, it was observed that the froth coating produces a much more sculptured surface and a higher degree of nubbiness. The total finish is lower than on the pad finished fabric, but all of the finish is on the face where it is desired. Also, unlike in padding, froth coating does not involve squeezing the fabric between two rolls so none of the texture in the base fabric is lost during the coating process.

EXAMPLE 3

A glass fabric was knife-coated with a formulation made by mixing the following components in the order given:

| Water | 300 g |
|---|---|
| Calgon | 5 g |
| Ethylene Glycol | 10 g |
| Polywet ND-2 | 5 g |
| Antifoam DB-110A | 3 g |
| Micral 932 | 160 g |
| Hydral 710 | 160 g |
| Calcium Carbonate | 160 g |
| Rhoplex AC-22 | 150 g |
| Rhoplex TR-407 | 20 g |
| Ammonia (28%) | 5 g |
| Acrysol ASE-60 (50%) | 20 g |

Antifoam DB-110A is a silicone defoamer from Dow Corning, Midland, Mich. Acrysol ASE-60 is a polymeric thickener supplied by Rohm & Haas Company. The coating paste was coated on one side of S/1963 glass fabric using a rubber squeegee as the knife applicator. The thickness of the coating was controlled by moderate pressure on the squeegee.

EXAMPLE 4

A silicone-based finish was prepared from the following formulation:

| Water | 300 g |
|---|---|
| Calgon | 5 g |
| Ethylene Glycol | 10 g |
| Polywet ND-2 | 5 g |
| Micral 932 | 160 g |
| Hydral 710 | 160 g |
| Calcium Carbonate | 160 g |
| Silastic Q3-5024 | 240 g |
| Antifoam DB-110A | 3 g |

The formulation was prepared in the order given with an Eppenbach high shear mixer. S/1963 glass fabric was padded with this bath, dried at 300° F. for 2 minutes, and then padded and dryed again. The total finish add-on was 11.7 OSY. While this sample was not tested for toxicity, it is expected that this product would produce even fewer combustion gases compared to an acrylic-based finish since the total organic content is lower. It will be appreciated that a mixture of silicone latexes and other latexes can be used where desired for specific properties. If a firmer hand is desirable, a small amount of a firm acrylic latex, such as a methylmethacrylate acrylic polymer, can be added.

EXAMPLE 5

A pad finish was prepared in a manner similar to Example 4. The formulation consisted of:

| Water | 340 g |
|---|---|
| Ammonia | 5 g |
| Tamol 850 | 5 g |
| Antifoam DB-110A | 3 g |
| Ethylene Glycol | 10 g |
| Calcium Carbonate | 160 g |
| RH-730 Aluminum Hydrate | 320 g |
| Rhoplex AC-22 | 140 g |
| Rhoplex TR-407 | 30 g |

S/1963 glass fabric was padded with this formulation at about 20 pounds pad pressure utilizing a rubber to steel padder. The fabric was then dried at 380° F. for 1 minute before being padded again under the same conditions. The final fabric had a finish add-on of about 10 OSY and had a desirable appearance and a raspy hand suitable for a ceiling board facing.

FLAME, SMOKE AND TOXICITY TESTS

This test is used to evaluate synthetic materials when they are subjected to high temperature heating. The test results are to evaluate the potential hazard from toxic gases produced should the material be burned or thermally decomposed in an enclosed area. The data developed include the determination of ignition time, burning time, composition of the atmosphere produced, and weight loss of material.

Procedure:

The equipment used to burn or thermally decompose the sample material is similar to the equipment formerly employed at the Materials Laboratory of the New York Naval Shipyard and by the Bureau of Mines Central Experiment Station at Pittsburgh for determining the flame resistance of thermosetting plastic, also as reported in U.S. Testing Company report #83413, for the Bureau of Ships, U.S. Navy and referenced in Military Specification MIL-M-14G.

The equipment consists of a specimen support, heating coil and spark generators mounted in an essentially gas tight chamber, equipped with facilities for sampling the test atmospheres produced. In brief, the tests are conducted by placing a stick or sticks of the materials to be tested (sample size-$5'' \times \frac{1}{2}'' \times \frac{1}{2}''$) in the center of a heating coil which is situated in the air tight chamber.

The heating coil is activated and the number of seconds it takes from the time the coil is activated until the sample begins to burn is recorded as the ignition time. After the stick has burned for 30 seconds, the heating coil is deactivated, and the number of seconds it takes for the sample to stop burning (from the time of deactivation) is recorded as the burning time. When the sample has stopped burning, the atmosphere produced is mixed by an internal circulating fan. A manifold circulating pump is then activated and the atmosphere within the chamber is withdrawn into gas analyzing apparatus.

A sample of the low toxicity ceiling board facing material according to Example 5 was tested to toxicity using the above procedure. Four separate samples of the same facing were tested with the results reported for each sample as well as an average for all four samples.

| RESULTS: | 1 | 2 | 3 | 4 | Average |
|---|---|---|---|---|---|
| Original Weight, g | 12.35 | 12.17 | 12.34 | 12.72 | — |
| Residual Weight, g | 10.74 | 10.62 | 10.88 | 11.09 | — |
| Loss in Weight, g | 1.61 | 1.55 | 1.46 | 1.63 | 1.56 |
| Temperature of Coil | (a) | (a) | (a) | (a) | |
| Ignition Time, seconds* | 18.0 | 417.8 | 417.7 | 417.6 | 418.8 |
| Burning Time, seconds | 0.0 | 0.0 | 0.0 | 0.0 | 0.0 |
| Temperature of Chamber, C | 29.0 | 31.0 | 31.0 | 32.0 | 31.0 |
| Beilstein | (b) | (b) | (b) | (b) | (b) |
| Smoke | (c) | (c) | (c) | (c) | (c) |
| Flame | (d) | (d) | (d) | (d) | (d) |
| Ash | (e) | (e) | (e) | (e) | (e) |

*Heating time, sample did not ignite.
(a) Equilibrium temperature 600° C.
(b) Negative
(c) Light amount of light grey smoke
(d) No flame
(e) Very light deposits of fine white particles

| Composition of Atmosphere (ppm) | 1 | 2 | 3 | 4 | Average |
|---|---|---|---|---|---|
| Hydrogen Chloride | 0 | 0 | 0 | 0 | 0 |
| Aldehydes as HCHO | 2 | 2 | 2 | 2 | 2 |
| Ammonia | 0 | 0 | 0 | 0 | 0 |
| Carbon Monoxide | 90 | 80 | 70 | 80 | 80 |
| Carbon Dioxide | 800 | 800 | 600 | 700 | 725 |
| Oxide of Nitrogen as $NO_2$ | 10 | 10 | 8 | 20 | 12 |
| Cyanides as HCN | 0 | 0 | 0 | 0 | 0 |

This test demonstrates that the ignition atmosphere contained, in the order of concentration, predominantly carbon dioxide with some carbon monoxide and only minor amounts of nitrogen dioxide with hardly a trace (2 ppm) of aldehydes. Cyanides, hydrogen chloride and ammonia were not detected. As used herein halogen-free means free or substantially free of chlorides, bromides and fluorides. Amounts of components in the test atmosphere reported above, other than carbon dioxide and monoxide, are all less than 100 ppm preferably less turn 50 ppm and most desirably less than 15 ppm.

Another method of evaluation is to compare the results of candidate facings with wood, for example oak or redwood, and relate the $LD_{50}$ and $LC_{50}$ values of each upon combustion. Acceptable facings will have toxicity values not unlike those of wood and preferably less than wood.

TUNNEL TEST

A sample of the product of Example 5 of the present invention was submitted to an ASTM E-84-81a Tunnel Test for flammability and the flame spread and smoke values determined.

The tests were performed in accordance with the specifications set forth in ASTM E84-81a. "Standard Test Method for Surface Burning Characteristics of Building Materials," both as to equipment and test procedure. This test procedures is similar to UL-723, ANSI No. 2.5, NFPA No. 255 and UBC 42-1.

The test results cover two parameters: flame spread and smoke developed values during a 10-minute fire exposure. Asbestos-cement board and red oak flooring are used as comparative standards and their responses are assigned arbitrary values of 0 and 100, respectively.

The performance of each material is evaluated in reaction to the performance of asbestos-cement board and red oak flooring under similar fire exposure.

One (1) 21″×24′0″ sample was laid on a 2 inch hexagonal wire mesh supported by steel rods spanning the width of the tunnel. The sample was conditioned at 73°±5° F. and 50±5 percent relative humidity.

Test Procedure: The tunnel was thoroughly preheated by burning natural gas. When the brick temperature, sensed by a floor thermocouple, had reached the prescribed 105° F.±5° F. level, the sample was inserted in the tunnel and test conducted in accordance with the standard ASTM E84-81a. procedures.

The operation of the tunnel was checked by performing a 10 minute test with asbestos-cement board on the day of the test.

The test results, calculated in accordance with ASTM E84-81a for flame spread and smoke developed values, are as follows:

Flame Spread Index: 0
Smoke Developed Value: 5

No ignition was noted in the 10-minute exposure to the flame. The specimen exhibited charring. There was no flamefront advancement. Neither afterflame nor afterglow were evident upon test completion.

I claim:
1. A process for manufacturing a coated, sculptured, nubby fabric useful as a ceiling board facing comprising:
   (1) applying, to at least one face of a nubby, textured fabric substrate made of a plurality of yarns, a uniform layer of a thick, flame-retardant coating containing a pigment, a flame-retardant and a resin, the coating contacting and encapsulating substantially all of the yarns of the substrate with a tough, adherent film, the coating composition when exposed to heat or flame emitting vapors of low-toxicity and low smoke, and
   (2) drying the thus-coated substrate to produce a sculptured, nubby, textured fabric having a noncellular coating thereon.
2. The process of claim 1 in which the textured fabric is a textured glass greige fabric.
3. The process of claim 1 in which the textured fabric is a textured glass printed fabric.
4. The process of claim 1 in which the coating is applied by padding an aqueous composition onto the fabric substrate.
5. The process of claim 4 in which the aqueous composition is applied to the substrate to provide a total add-on at the completion of drying of at least four ounces per square yard of fabric.
6. The process of claim 5 in which the total add-on is up to about 10 ounces per square yard.

7. The process of claim 1 in which the coating is applied to the substrate in the form of a foam.

8. The process of claim 1 in which the coated fabric when exposed to thermal composition emits less than 100 parts per million of halogens.

9. The process of claim 1 in which the coated fabric when exposed to thermal decomposition emits less than 100 parts per million of aldehyde as HCHO.

10. The process of claim 1 in which the coated fabric when exposed to thermal decomposition emits less than 100 parts per million of ammonia.

11. The process of claim 1 in which the coated fabric when exposed to thermal decomposition emits less than 100 parts per million of cyanides as HCN.

12. The process of claim 1 in which the coated fabric when exposed to thermal decomposition emits less than 50 parts per million nitrogen oxides measured as $NO_2$.

13. A nubby fabric suitable for use as a ceiling board facing made in accordance with the process of claim 1.

* * * * *